United States Patent
Fujibayashi et al.

(10) Patent No.: US 6,647,353 B2
(45) Date of Patent: Nov. 11, 2003

(54) ACCELERATION/DECELERATION METHOD

(75) Inventors: Kentaro Fujibayashi, Musashino (JP); Tetsuo Hishikawa, Yamanashi (JP); Yusaku Yamada, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 167 days.

(21) Appl. No.: 09/974,805

(22) Filed: Oct. 12, 2001

(65) Prior Publication Data
US 2002/0069029 A1 Jun. 6, 2002

(30) Foreign Application Priority Data

Oct. 13, 2000 (JP) ........................ 2000-313200

(51) Int. Cl.⁷ .............................................. G06F 15/00
(52) U.S. Cl. ........................................ 702/152; 702/150
(58) Field of Search ............................... 318/568, 568.1, 318/568.11, 568.15, 568.18, 558.18, 570; 356/152; 364/167.01, 513; 395/87; 700/245, 250, 251, 253, 257; 702/150, 152, 153

(56) References Cited

U.S. PATENT DOCUMENTS

| | | | | |
|---|---|---|---|---|
| 4,134,681 A | * | 1/1979 | Elmer | 356/152 |
| 4,593,366 A | * | 6/1986 | Sugimoto et al. | 364/513 |
| 4,594,671 A | * | 6/1986 | Sugimoto et al. | 364/513 |
| 4,774,445 A | * | 9/1988 | Penkar | 318/568 |
| 4,829,219 A | * | 5/1989 | Penkar | 318/568.18 |
| 4,972,131 A | * | 11/1990 | Kojyo et al. | 318/568.1 |
| 5,157,315 A | * | 10/1992 | Miyake et al. | 318/568.11 |
| 5,369,568 A | * | 11/1994 | Song | 364/167.01 |
| 5,373,439 A | * | 12/1994 | Jeon | 364/167.01 |
| 5,379,367 A | * | 1/1995 | Song | 395/87 |
| 5,434,489 A | * | 7/1995 | Cheng et al. | 318/568.15 |
| 5,444,343 A | * | 8/1995 | Enomoto et al. | 318/568.11 |
| 5,708,342 A | * | 1/1998 | Nihei et al. | 318/558.18 |
| 6,008,609 A | * | 12/1999 | Sawashima et al. | 318/570 |

FOREIGN PATENT DOCUMENTS

| | | | | |
|---|---|---|---|---|
| JP | 63-151289 | 5/1988 | | |
| JP | 01-239607 | 9/1989 | | |
| JP | 03-212707 | 9/1991 | | |
| JP | 06-138920 | 5/1994 | | |
| JP | 06-337708 | * 12/1994 | ........... | G05B/19/18 |
| JP | 08-320714 | 12/1996 | | |
| JP | 2000-026072 | * 1/2000 | ........... | B66C/13/22 |
| JP | 2000-142921 | * 5/2000 | ............ | B65G/1/04 |

OTHER PUBLICATIONS

Jeon, J; Ha, Y; "A Generalized Approach for the Acceleration and Deceleration of Industrial Robots and CNC Machine Tools"; IEEE Transactions on Industrial Electronics; Vol 47 Issue 1; Feb. 2000, pp 133–139.*

Jeon, J; "A Generalized Approach for the Acceleration and Deceleration of CNC Machine Tools"; Proceedings of 22$^{nd}$ International Conference on Industrial Electronics, Control and Instrumentation; Vol 2; Jun. 1996; pp 1283–1288.*

Kim, D; Lee, J; "Full Digital Joint Motion Controller for Industrial Robot and CNC Machine Tool"; Conference Record of the IEEE Industry Applications Society Annual Meeting, 1994; Oct. 1994; Vol 3; pp 1813–1820.*

Duffy, N; Slawek, P; "Collision Avoidance for a Multi–Arm Robotic Cell"; IEE Colloquium on Multi–Arm Robotics; Jun. 1992; pp 2/1–2/4.*

* cited by examiner

*Primary Examiner*—John Barlow
*Assistant Examiner*—Douglas N Washburn
(74) *Attorney, Agent, or Firm*—Staas & Halsey LLP

(57) ABSTRACT

An acceleration/deceleration method capable of synchronizing two axes in velocity and also in position is disclosed. A follower axis X continues to be accelerated after a velocity Vx of the follower axis X reaches a target velocity Vy of an objective axis Y and the acceleration is changed over to a deceleration to achieve the target velocity Vy. The time for changing over the acceleration to the deceleration is determined so that the motion amount of the position Px of the follower axis X in excess of the motion amount of the position Py of the objective axis Y is equal to the sum of the displaced motion amount in the acceleration motion and an initial positional difference. Thus, the position and velocity of the follower axis X coincide with the position and velocity of the objective axis Y to achieve complete synchronism of the two axes in the case where there is a positional difference and a velocity difference between the two axes.

13 Claims, 9 Drawing Sheets

VELOCITY WITHOUT ACCELERATION/
DECELERATION PROCESSING — — — — —

VELOCITY WITH LINEAR
ACCELERATION/DECELERATION ─────────
PROCESSING

VELOCITY WITHOUT ACCELERATION/ — — — — —
DECELERATION PROCESSING

VELOCITY WITH PURSUING
ACCELERATION/DECELERATION ─────────
PROCESSING

ACCELERATION/DECELERATION METHOD

BACKGROUND OF THE INVENTION

1. Field of the Invention

The present invention relates to an acceleration/deceleration method for controlling one movable object driven by one axis to pursue another movable object driven by another axis in an industrial machine such as a wrapping machine and a machine tool.

2. Description of the Related Art

In a generally adopted conventional acceleration/deceleration method, a follower axis (which drives a movable object to pursue another movable object driven by an objective axis) is accelerated/decelerated so that only a velocity of the follower axis is made equal to a velocity of the objective axis. For example, in a case of controlling the velocity Vx of the follower axis X to pursue the velocity Vy of the objective axis Y with a velocity difference Ve therebetween, as shown in FIG. 1, a motion of the follower axis X is delayed by an amount in the case where an acceleration/deceleration control (a linear acceleration/deceleration control in this example) is performed as indicated by the continuous line in comparison with the case where no acceleration/deceleration control is performed as indicated by the broken line to produce a positional displacement between the follower axis X and the objective axis Y. In the case where the objective axis moves at an initial velocity Vy and the following axis X moves at an initial velocity Vx0 when a pursuing command is issued (t=0), the velocity Vx of the follower axis X reaches the target velocity Vy of the objective axis Y at a time te by the linear acceleration/deceleration control. Assuming that an initial positional displacement is "0" at the starting of the pursuing motion, a positional displacement corresponding to an area S1 (=Ve×te/2) remains after and the velocity Vx of the follower axis X equals the velocity Vy of the objective axis Y to make the velocity difference Ve "0".

As described, according to the conventional acceleration/deceleration method, the position of the follower axis X is displaced with respect to the position of the objective axis Y to cause a positional displacement between the positions of the two axes although the velocity Vx of the follower axis X is made coincide with the velocity Vy of the objective axis Y. In general, it is preferable to make the position as well as the velocity of the follower axis coincides with the position and the velocity of the objective axis Y, respectively in controlling the follower axis X in synchronism with the objective axis Y.

SUMMARY OF THE INVENTION

An object of the present invention is to provide an acceleration/deceleration method capable of controlling a follower axis to pursue an objective axis so that a velocity and also a position of the follower axis coincide with a velocity and a position of the objective axis, respectively.

According to an aspect of the present invention, the acceleration/deceleration method comprises the steps of: obtaining a positional difference between positions of an objective axis and a follower axis and a velocity difference between velocities of the objective axis and the follower axis; performing a predetermined acceleration/deceleration processing based on the positional difference and the velocity difference, so that the position and the velocity of the follower axis coincide with the position and the velocity of the objective axis, respectively.

According to another aspect of the present invention, the acceleration/deceleration method comprises the steps of: obtaining a sum of a positional displacement between the follower axis and the objective axis from a start of an acceleration/deceleration, and an initial positional difference between the follower axis and the objective axis at the start of the acceleration/deceleration; and controlling a time period of the acceleration and a time period of the deceleration of the follower axis so that the sum of the positional displacement and the initial positional difference is made zero when the velocity of the follower axis coincides with the velocity of the objective axis.

Conditions of an initial positional difference and an initial velocity difference between the objective axis and the follower axis may be sorted into a plurality of cases and the velocity of the follower axis may be obtained for each case. Further, the positional difference and the velocity difference between the follower axis and the objective axis may be used as dynamic conditions for obtaining the velocity of the follower axis in the acceleration/deceleration, and the acceleration/deceleration may be dynamically performed by determining velocity of the follower axis based on the dynamic condition.

Different acceleration/deceleration values may be set for the acceleration of the follower axis with respect to the objective axis and for the deceleration of the follower axis with respect to the objective axis. Further, the velocity of the follower axis may be limited not to exceed a predetermined value.

According to still another aspect of the present invention, the acceleration/deceleration method comprises the steps of: obtaining a positional difference between the positions of the objective axis and the follower axis and a velocity difference between the velocities of the objective axis and the follower axis; setting acceleration/deceleration values for acceleration and deceleration of the follower axis; and starting acceleration/deceleration of the follower axis in response to an acceleration/deceleration start command, and controlling the follower axis so that the velocity of the follower axis pursues to coincide with the velocity of the objective axis through an acceleration process and a deceleration process with the set acceleration/deceleration value. A change-over from the acceleration process to the deceleration process or from the deceleration process to the acceleration process of the follower axis is determined based on the positional difference between the objective axis and the follower axis and a motion amount of the follower axis with respect to a motion amount of the objective axis from time of the change-over of the acceleration/deceleration to time when the velocity of the follower axis reaches the velocity of the objective axis.

A constant velocity process where the follower axis is driven at a constant velocity may be interposed between the acceleration process and the deceleration process.

DETAILED DESCRIPTION OF THE PREFERRED EMBODIMENTS

Figure 1:
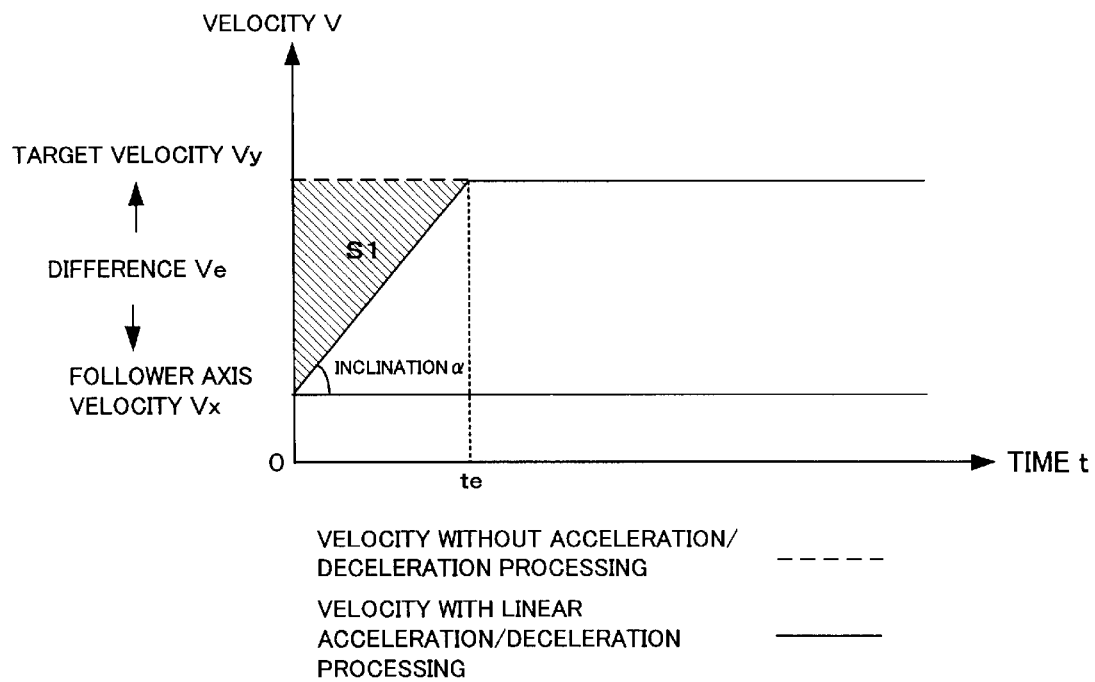
FIG. 1 is a schematic diagram for showing a control method of making a follower axis pursue an objective axis according to a conventional linear acceleration/deceleration control.
Figure 2:
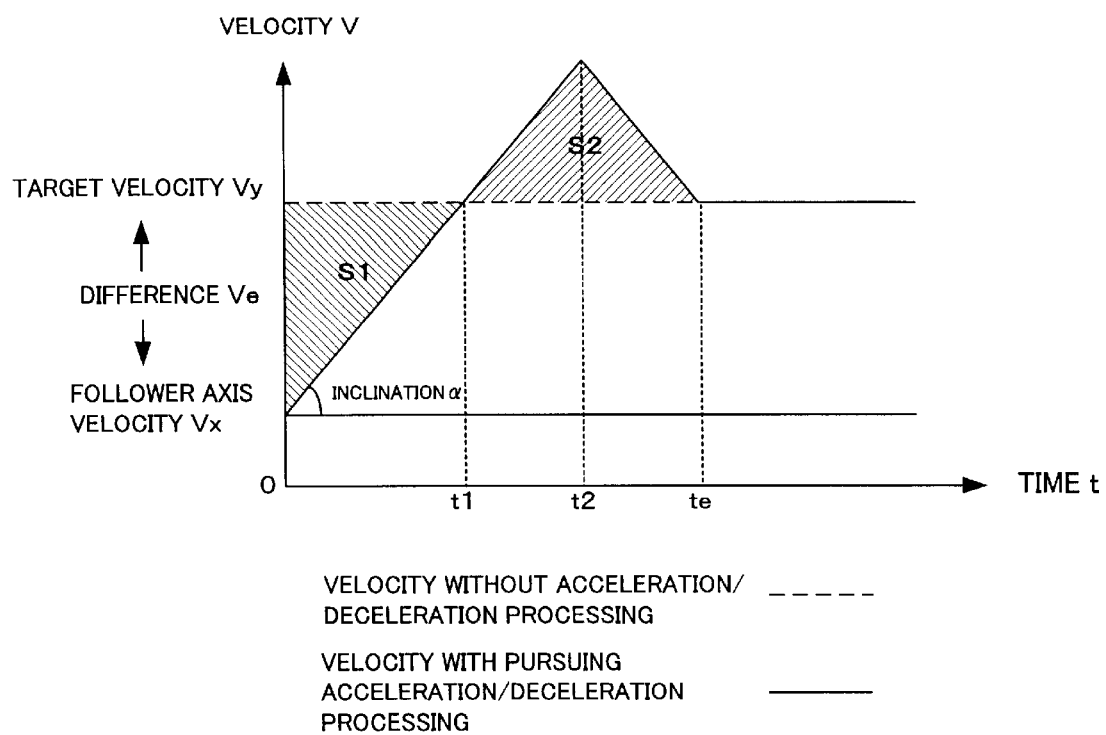
FIG. 2 is a schematic diagram for showing a general principle of the acceleration/deceleration method of the present invention.

FIG. 2 shows a principle of an acceleration/deceleration method of the present invention in which a velocity and a position of a follower axis X are controlled to pursue a velocity and a position of an objective axis Y, respectively. In FIG. 2, variations of the velocities of the follower axis X and the objective axis Y are shown with respect to time.

In the following description, Px and Py represent positions of the follower axis X and the objective axis Y, respectively; Vx and Vy represent velocities of the follower axis X and the objective axis Y, respectively; Px0 and Py0 represent initial positions of the follower axis X and the objective axis Y, respectively, and Vx0 and Vy0 represent initial velocities of the following axis X and the objective axis Y, respectively at a start of the acceleration/deceleration control. Further, a positional difference between the position Px of the follower axis X and the position Py of the objective axis Y is represented by dp (=Py−Px), a velocity difference between the velocity Vx and the velocity Vy is represented by dv (=Vy−Vx), an initial positional difference between the initial position Px0 and the initial position Py0 is represented by dp0 (=Py0−Px0), and an initial velocity difference between the initial velocity Vx0 and the initial velocity Vy0 is represented by dv0 (=Vy0−Vx0). The velocity Vy is a target velocity of the follower axis X which has a constant value equal to the initial velocity Vy0.

In this example, the initial velocity Vx0 of the follower axis X is lower than the initial velocity Vy0 of the objective axis Y to make a velocity difference Ve (dv0) therebetween and there is no positional difference between the initial position Px0 of the follower axis X and the initial position Py0 of the objective axis Y at the start (t=0) of the pursuing motion. In these conditions, the acceleration/deceleration control is performed so that the velocity Vx of the follower axis X is equal to the velocity Vy of the objective axis Y with no positional difference.

An acceleration of the follower axis X is started with an acceleration value (inclination ) αat time t=0, so that the velocity Vx reaches the target velocity Vy at time t1. According to the acceleration/deceleration method of the present invention, the follower axis X is continued to be accelerated and then a deceleration of the follower axis X is started with a deceleration value α (acceleration−α) at time t2. The deceleration of the follower axis X is stopped when the velocity Vx reaches the target velocity Vy at time te with no positional difference. The acceleration value a is not necessarily a constant value.

As shown in FIG. 2, since the velocity Vx of the follower axis X is maintained lower than the target velocity Vy until the velocity Vx reaches the target velocity Vy, a positional difference corresponding to an area S1 (=Ve×t1/2) indicated by hatching in FIG. 2 is produced between the position Px and the position Py.

In order to cancel the above positional difference, the follower axis X is continued to be accelerated after the velocity Vx reached the target velocity Vy and then turned over to the deceleration at the time t2 to reach the target velocity Vy again. The time t2 is determined so that an area S2, which corresponds to a motion amount of the follower axis X in excess of a motion amount of the objective axis Y while the velocity Vx exceeds the target velocity Vy, is equal to the area S1 which corresponds to the positional difference. As a result, the area S1 is equal to the area S2 when the velocity Vx reaches the target velocity Vy again, so that the positional displacement produced in a time period from the start (t=0) of the acceleration to the arrival (t=t1) at the target velocity Vy is canceled. Thus, the velocity Vx and also position Px of the follower axis X coincide with the velocity Vy and position Py of the objective axis Y, respectively, after the time te.

Figure 3:
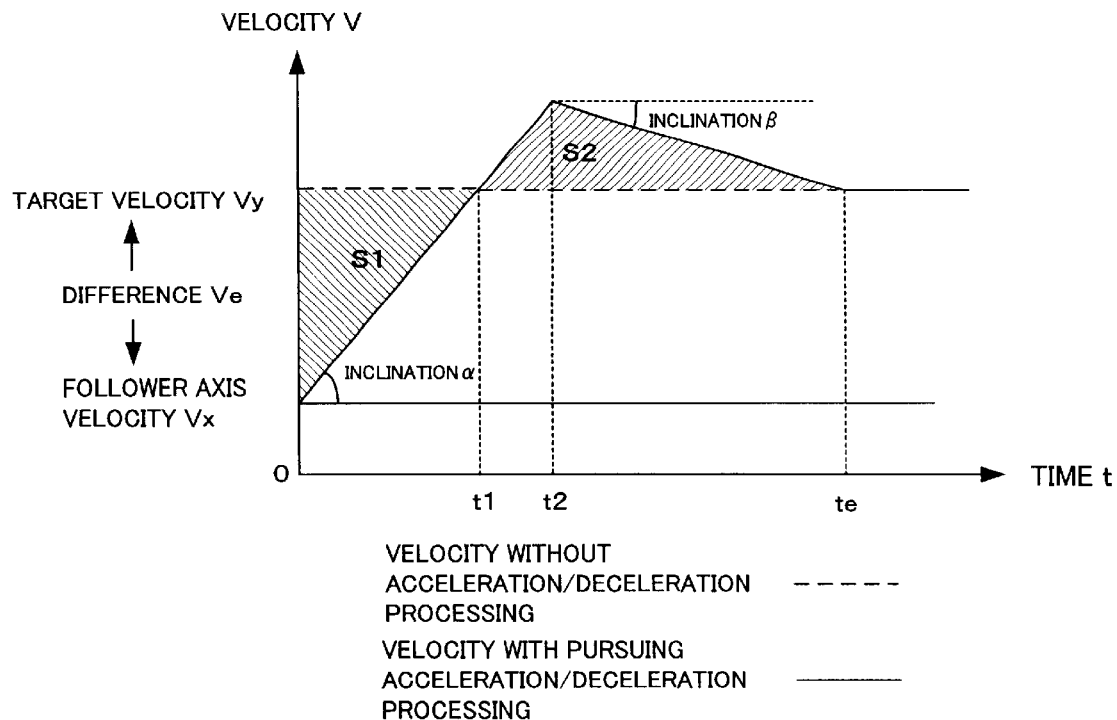
FIG. 3 is a schematic diagram for showing a principle of the present invention in which different acceleration/deceleration values are set for an acceleration and for a deceleration of a follower axis.

FIG. 3 shows another embodiment in which an acceleration value (inclination) α for the accelerating motion is set different from a deceleration value β for the decelerating motion of the follower axis X. In this embodiment also, a positional difference between the position Py of the objective axis Y and the position Px of the follower axis X is produced corresponding to the area S1 in the time period from the start (t=0) of the acceleration to the arrival (t=t1) at the target velocity Vy. After the velocity Vx reaches the target velocity Vy, the follower axis X is accelerated with the acceleration value α until the time t2 and decelerated with the deceleration β until the velocity Vx reaches the target velocity Vy, so that the follower axis X moves at the constant velocity same as the target velocity Vy after reaching the target velocity Vy again. The time t2 is determined so that the area S2 corresponding to the motion amount after the velocity Vx exceeds the target velocity Vy is equal to the area S1 corresponding to the motion amount before the velocity Vx reaches the target velocity Vy, to make the position and the speed of the follower axis X coincides with the position and the speed of the objective axis Y, respectively.

Figure 4:
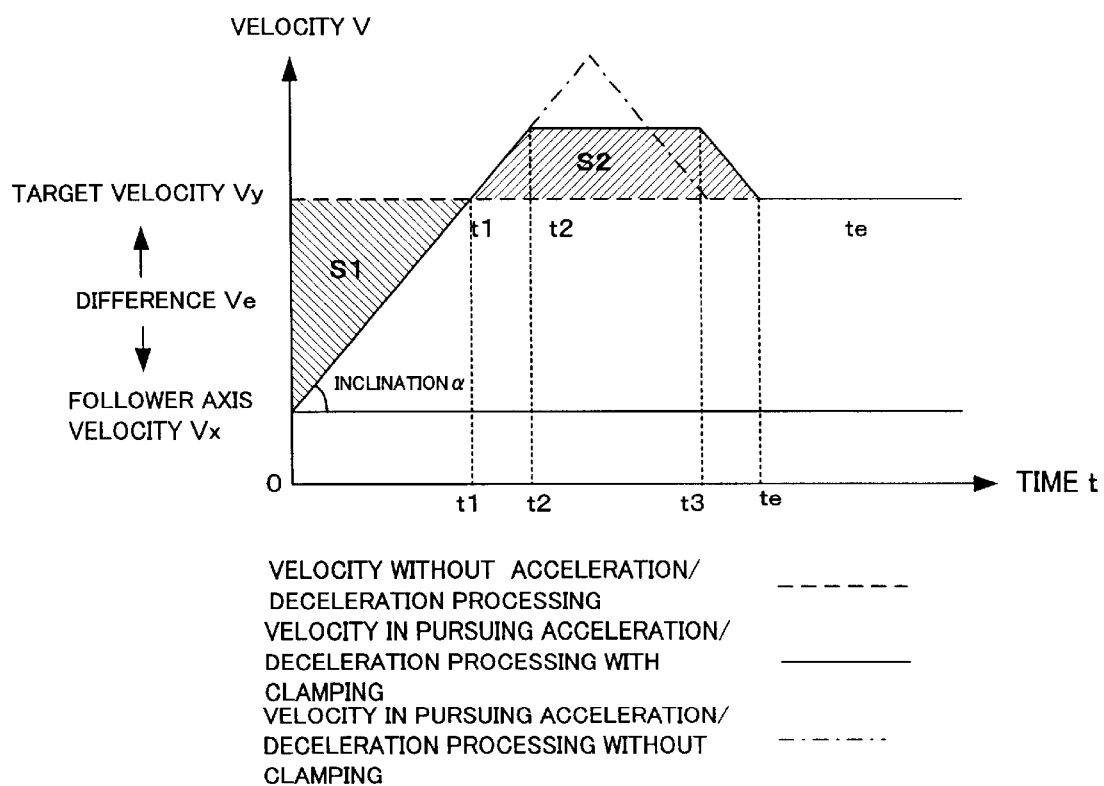
FIG. 4 is a schematic diagram for showing a principle of the present invention in which a velocity of the follower axis is limited not to exceed a predetermined value.

FIG. 4 shows another embodiment of the pursuing acceleration/deceleration method in which the velocity Vx of the follower axis X in the acceleration/deceleration is clamped or limited to be not higher than a predetermined level. In this example also, a positional difference corresponding to the area S1 is produced between the position Py of the objective axis Y and the position Px of the follower axis X in the time period between a start (t=0) of the acceleration and an arrival (t=t1) to the target velocity Vy. Specifically, the motion amount of the objective axis Y is (Vy×t), whereas the motion amount of the follower axis X is (Ve×t/2+Vx×t), and therefore the follower axis X is delayed by the difference S1=Ve×t/2.

In order to cancel the positional difference, the follower axis X is continued to be accelerated so that the velocity Vx of the follower axis X exceeds the target velocity Vy to make an excessive motion amount S2 to balance the displaced amount S1. In this case, the velocity Vx is clamped or limited not to exceed the predetermined value so that the constant velocity portion is formed as shown in FIG. 4. The distance S2 in moving at the velocity exceeding the velocity Vy of the objective axis Y is equal to the displacement S1. Thus, the position Px of the follower axis X is not displaced from the position Py of the objective axis Y after the velocity Vx coincides with the velocity Vy and the follower axis X moves with the objective axis Y at the same velocity and maintaining the relative position of the axes.

In the foregoing embodiments, the description is made on the case where there is no initial positional displacement between the follower axis X and the objective axis Y at the start (t=0) of the acceleration/deceleration control. However, in the case where there is a positional displacement between the follower axis X and the objective axis Y at the start of the acceleration/deceleration control, the initial positional displacement can be canceled according to the present invention.

The acceleration/deceleration method in the case where there is an initial positional displacement between the follower axis and the objective axis will be described.

(1) In the case of the objective axis Y "leaving from" the follower axis X

Figure 5:
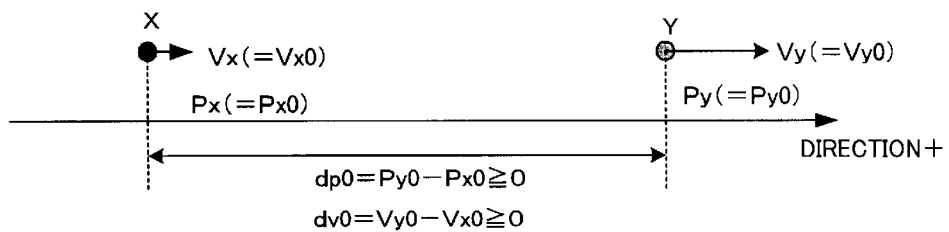
FIG. 5 is a schematic diagram for showing an example of initial conditions of positions and velocities of the objective axis and the follower axis in applying the method of the present invention.

FIG. 5 shows an example of the case (1), in which the initial positional difference dp0 (=Py0−Px0) and the initial velocity difference dv0 (=Vy0−Vx0) are of positive values and the objective axis Y and the follower axis X are moving in the positive direction at the start of the acceleration/deceleration control.

Figure 6:
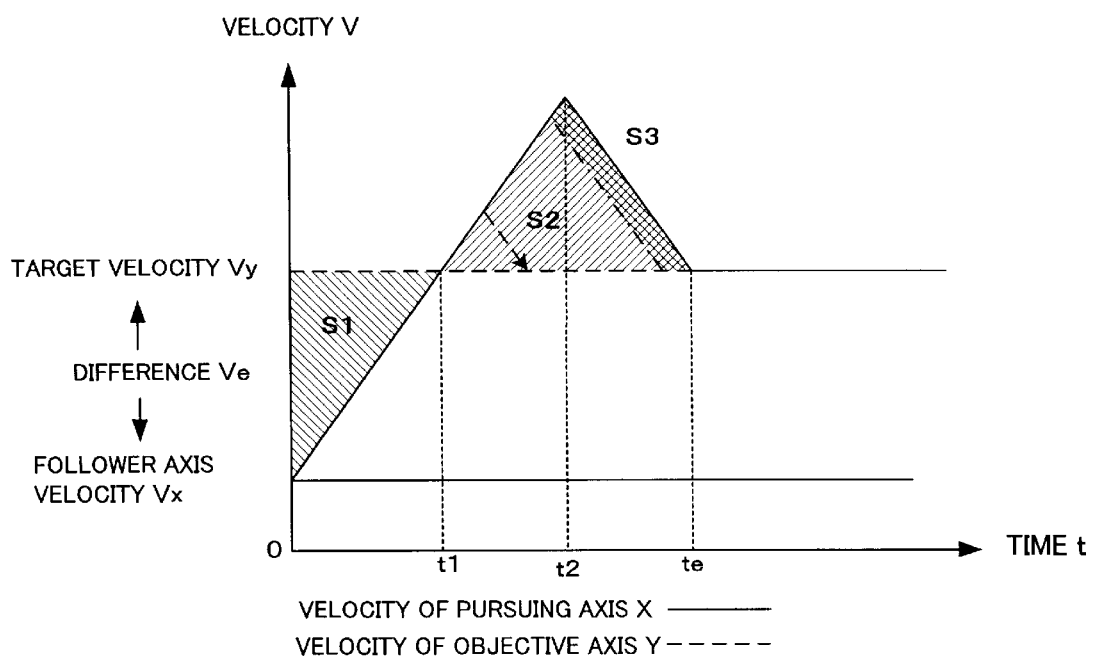
FIG. 6 is a schematic diagram for showing variations of velocities and motion amounts of the objective axis and the follower axis with the conditions shown in FIG. 5, according to the method of the present invention.

As shown in FIG. 6, the displaced motion amount of the follower axis X behind the objective axis Y produced from the start (t=0) of the acceleration to the arrival (t=t1) of the velocity Vx at the target velocity Vy is represented by the area S1, as described. If the follower axis X is accelerated and decelerated to make the velocity Vx coincide with the velocity Vy so that the area S2 corresponding to the motion amount of the follower axis X in excess of the motion amount of the objective axis Y after the velocity Vx exceeds the velocity Vy is equal to the area S1, the displacement between the follower axis X and the objective axis Y is made equal to the initial displacement dp0 at the start time of the acceleration/deceleration and the position Px of the follower axis X is behind the position Py of the objective axis Y by the distance dp0.

In order to compensate the initial positional difference dp0 at the start of the acceleration/deceleration control, the follower axis X is advanced with respect to the objective axis Y by the initial positional difference dp0. This is achieved by elongating the time period of the acceleration longer than the time period for making the area S2 equal to the area S1 to delay the time t2 at which the acceleration is changed over to the deceleration. The time t2 is determined so that the area S3 equal to the initial positional difference dp0 is formed, thereby the velocities and the positions of the follower axis X and the objective axis Y are made equal to each other and move in complete synchronism.

The above described example is one of cases in which the position Px of the follower axis X and the position Py of the objective axis Y are leaving from each other. There are six cases (a)–(f) where the position Px and the position Py are leaving from each other, as shown in FIG. 11.

(a) dp0 > 0, dv0 ≧ 0, Vx > 0 and Vy > 0 (this case is shown in FIG. 6), (or dv = 0)
(b) dp0 > 0, dv0 > 0, Vx < 0 and Vy > 0
(c) dp0 > 0, dv0 ≧ 0, Vx < 0 and Vy < 0
(d) dp0 < 0, dv0 ≦ 0, Vx > 0 and Vy > 0
(e) dp0 < 0, dv0 < 0, Vx > 0 and Vy < 0
(f) dp0 < 0, dv0 ≦ 0, Vx < 0 and Vy < 0

Figure 11:
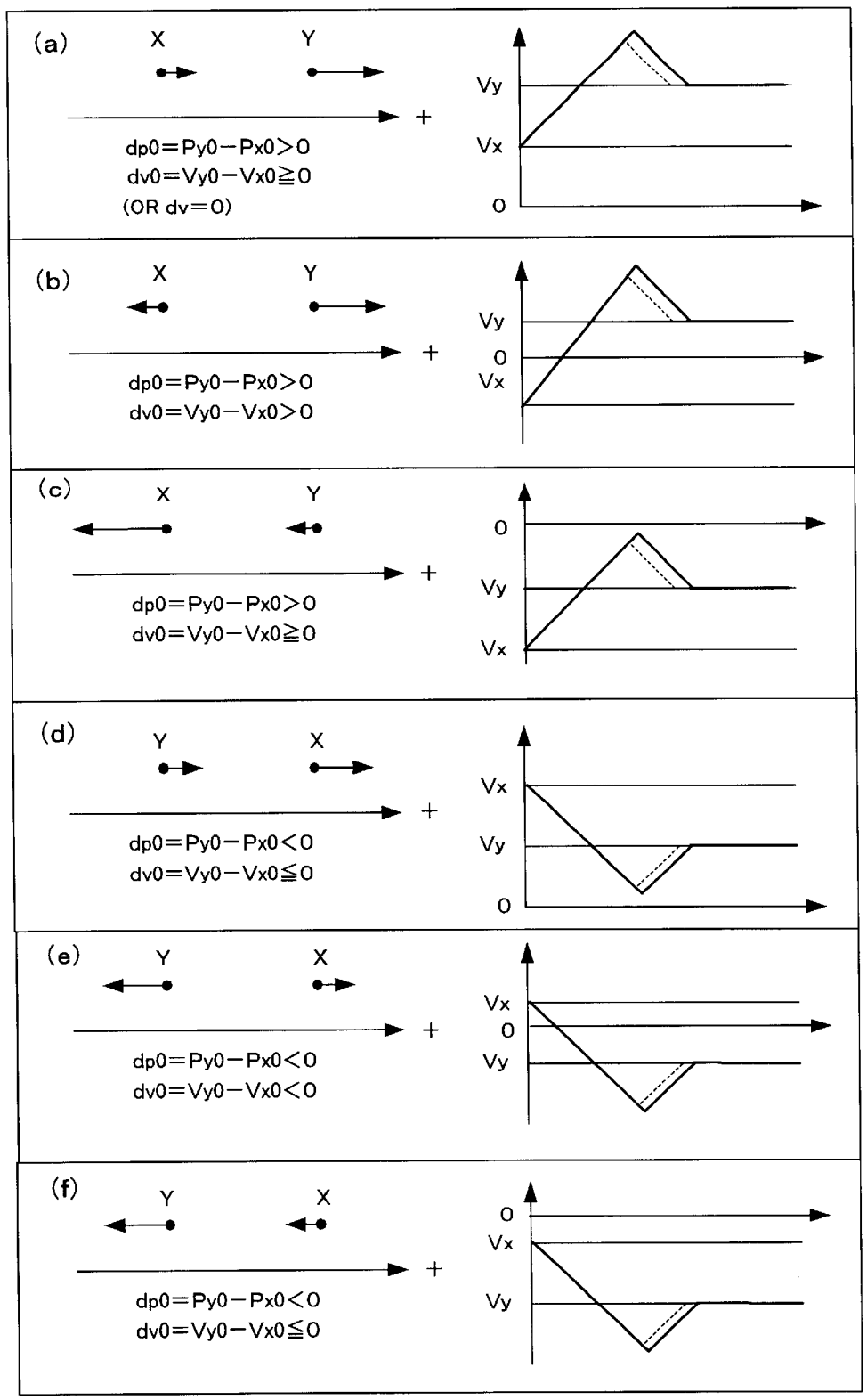
FIG. 11 is a schematic diagram showing variation of velocities and motion amounts of the objective axis and the follower axis in the case where the objective axis is leaving from the follower axis at the time of starting the acceleration/deceleration control.

As shown in FIG. 11, the time of changing the accelerating motion over to the decelerating motion is delayed with respect to the time of switching in the case where the positional difference dp0 is "0" in accordance with the amount of the initial positional difference dp0, to thus cancel the initial positional difference dp0 and render the positions Px and Py and the velocities Vx and Vy of the follower axis X and the objective axis Y be equal to move in synchronism.

Figure 7:
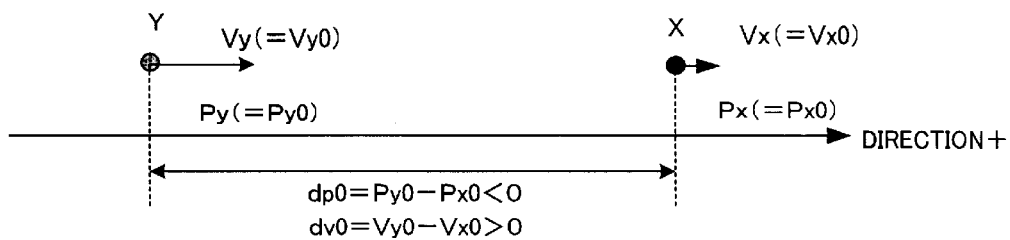
FIG. 7 is a schematic diagram for showing another example of initial conditions of positions and velocities of the objective axis and the follower axis in applying the method of the present invention.

(2) In the case where the objective axis Y is approaching the follower axis X:

FIG. 7 shows an example of the case (2) in which the initial positional difference dp0 is negative and the initial velocity difference dv0 is positive. The initial position Px0 of the follower axis X is advanced with respect to the initial position Py0 of the objective axis Y to form the initial positional difference dp0 (=Py0−Px0) of negative value. The initial velocity Vx0 of the follower axis X is larger than the velocity Vy0 of the objective axis Y to form the initial velocity difference dv0 (=Vy0−Vx0) of positive value. The objective axis Y and the follower axis X are both moving in the positive direction.

In this case, the acceleration/deceleration processing is determined in dependence on values of the positional difference dp0 and the velocity difference dv0.

Figure 8:
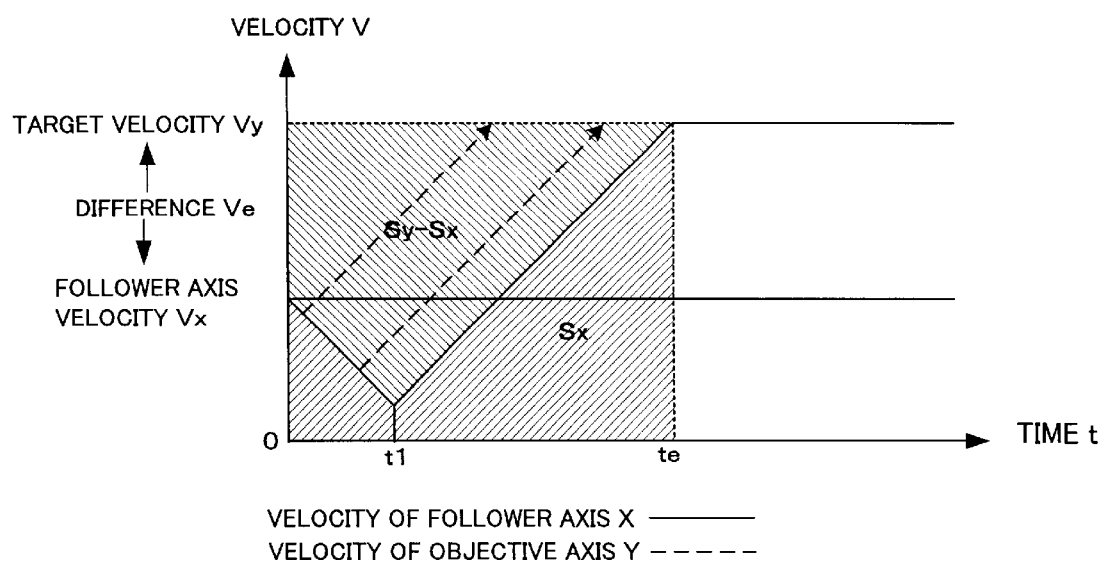
FIG. 8 is a schematic diagram for showing variations of velocities and motion amounts of the objective axis and the follower axis with the conditions shown in FIG. 7, wherein a positional difference is relatively large.

FIG. 8 shows an acceleration/deceleration processing in the case where the positional difference dp0 is relatively large and the velocity difference dv0 is relatively small.

First, in order to compensate the initial positional difference dp0, the follower axis X is accelerated in the negative direction, i.e., decelerated and then accelerated in the positive direction at time t1 so that the velocity Vx reaches the velocity Vy of the objective axis Y at time te. The motion amount Sy of the objective axis Y from the time t=0 to the time t=te is expressed as "Vy×te". On the other hand, the motion amount Sx of the follower axis X is expressed by the area indicated by the hatching slanted from left below to right up in FIG. 8. Thus, the positional difference (Sx−Sy) obtained by subtracting the motion amount Sx of the follower axis X from the motion amount Sy of the objective axis Y is expressed by the area indicated by the hatching slanted from the left up to the right below. The position Px and velocity Vx of the follower axis X are made equal to the position Py and velocity Vy of the objective axis Y, respectively, by making the distance (Sx−Sy) equal to the initial positional distance dp0. This is achieved by appropriately setting the time t1 at which the decelerating motion of the follower axis X is changed over to the accelerating motion.

Figure 9:
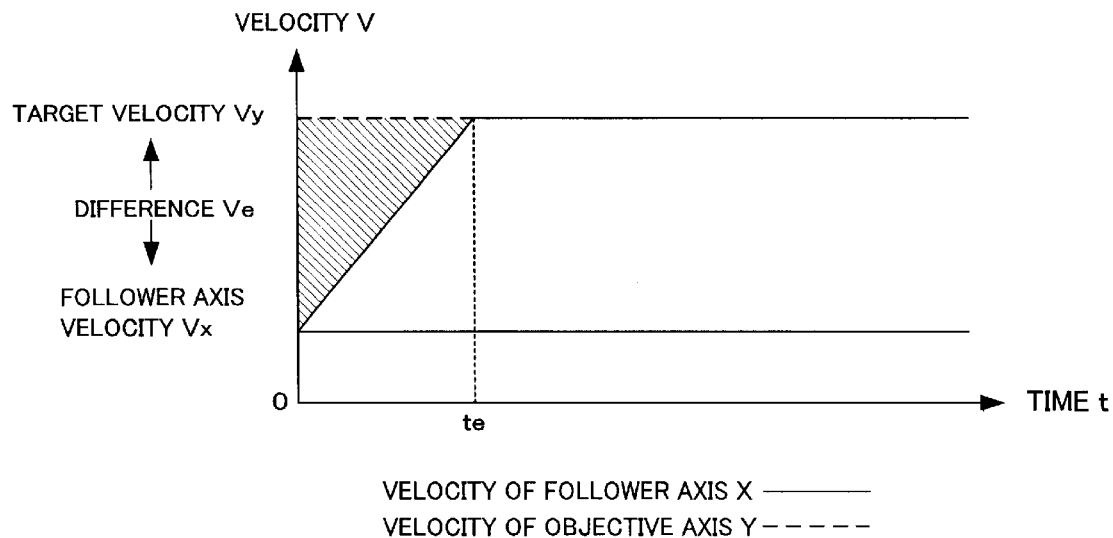
FIG. 9 is a schematic diagram for showing variations of velocities and motion amounts of the objective axis and the follower axis with the conditions shown in FIG. 7 wherein the positional difference is relatively small.

In the case where the positional difference dp0 and the velocity difference dv0 are not large, i.e., the positional difference dp0 can be eliminated by accelerating the follower axis X with an acceleration value not greater than the maximum acceleration value from the start time (t=0) of the acceleration to the arrival at the target velocity Vy, the follower axis X is controlled as shown in FIG. 9.

The follower axis X is accelerated with an appropriately determined acceleration value so that the velocity Vx reaches the target velocity Vy at time te. The positional difference obtained by subtracting the motion amount Sx of the follower axis X from the motion amount Sy of the objective axis Y form the start time (t=0) to the arrival (t=te) at the target velocity Vy is expressed by the area indicated by the hatching. The acceleration value is determined so that the displaced amount (Sy−Sx) is equal to the initial positional difference dp0 between the follower axis X and the objective axis Y.

Figure 10:
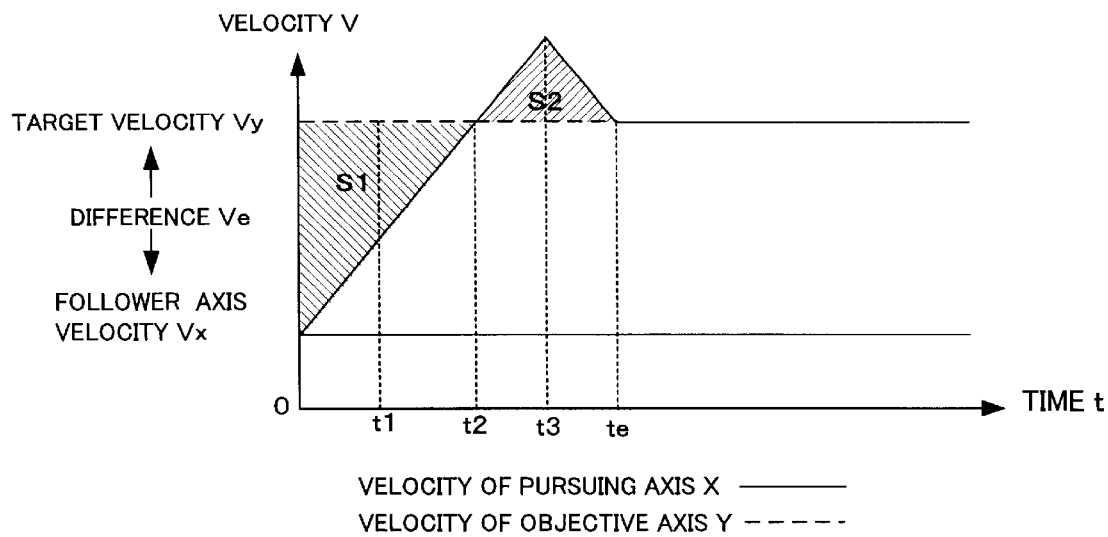
FIG. 10 is a schematic diagram for showing variations of velocities and motion amounts of the objective axis and the follower axis with the conditions shown in FIG. 7, wherein the positional difference is very small.

In the case where the initial positional difference dp0 is relatively small and the initial velocity difference dv0 is relatively large, the acceleration/deceleration processing is performed as shown in FIG. 10. In this case, the position Px of the follower axis X is passed by the position Py of the objective axis Y before the time t2 at which the velocity Vx reaches the target velocity Vy, even if the follower axis X is accelerated with the maximum acceleration value immediately from the time t=0 to make the velocity Vx equal to the target velocity Vy.

As shown in FIG. 10, the follower axis X is started to pursue the objective axis Y with the maximum acceleration value immediately at the time t=0, so that the velocity Vx reaches the target velocity Vy at time t2. The positional displacement obtained by subtracting the motion amount of the follower axis X from the motion amount of the objective axis Y from the start time "0" to the time t2 is expressed by the area S1 indicated by the hatching slanting from the left above to the right below. If the positional displacement S1 is larger than the initial positional difference dp0, it means that the position Px of the follower axis X has been passed by the position Py of the objective axis Y when the velocity Vx of the follower axis X reaches the velocity Vy of the objective axis Y at the time t2. For example, the position Px of the follower axis X is passed by the position Py of the objective axis Y at time t1.

Thus, the follower axis X is continued to be accelerated to balance the positional difference produced after the position Px of the follower axis X is passed by the position Py of the objective axis Y. The accelerating motion of the follower axis X is changed over to the decelerating motion at time t3 when the equation S1−dp0=S2 is satisfied to make the velocity Vx equal to the target velocity Vy.

Figure 12:
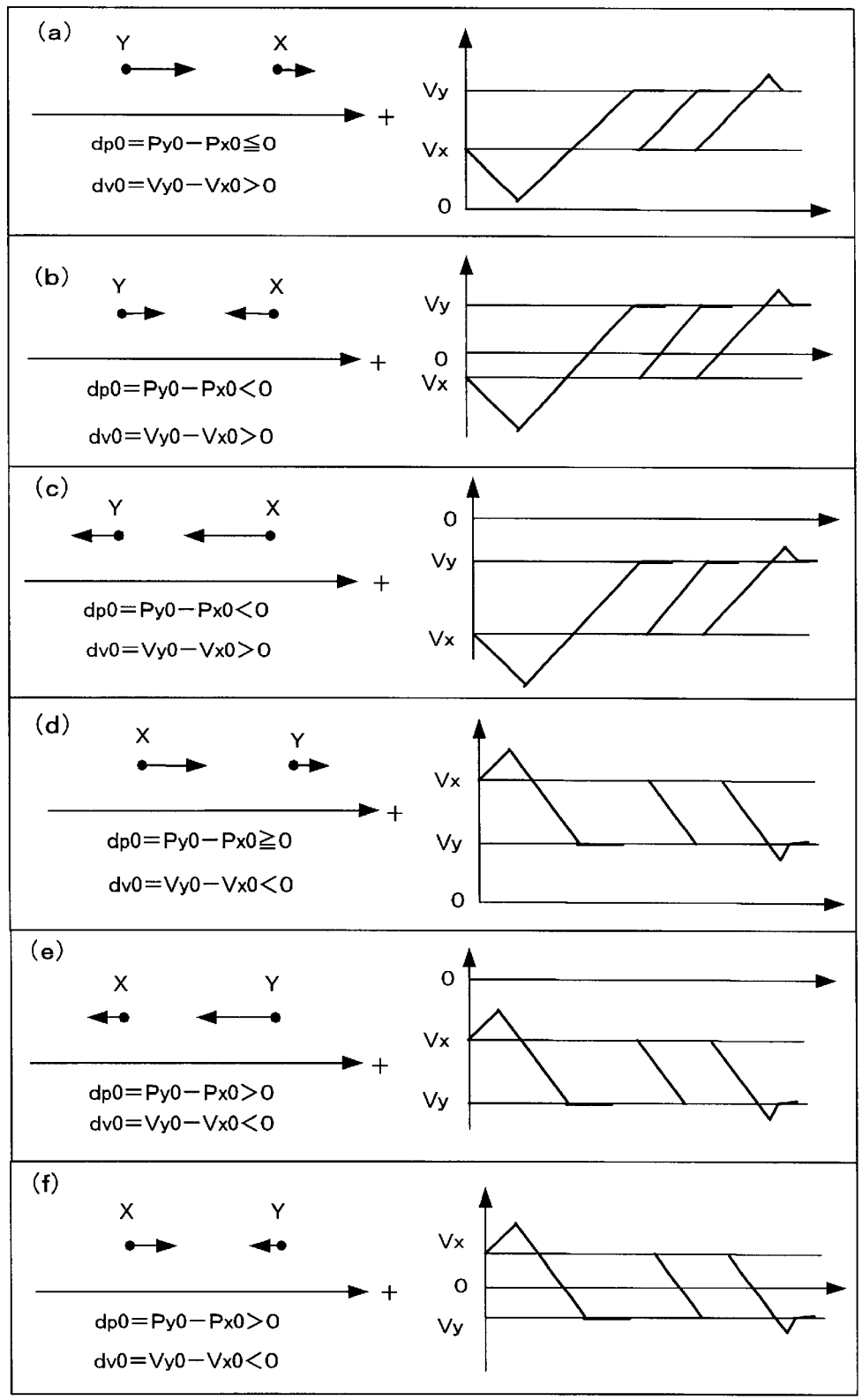
FIG. 12 is a schematic diagram showing variation of velocities and motion amounts of the objective axis and the follower axis in the case where the objective axis is approaching the follower axis at the time of starting the acceleration/deceleration control.

There are six cases where initial position Py0 of the objective axis Y is approaching the initial position Px0 of the follower axis X, i.e., the positional difference is decreasing, as shown in FIG. 12.

| | | |
|---|---|---|
| (a) | dp0 ≦ 0, dv0 > 0, Vx > 0 and Vy > 0 | (as described in FIG. 7) |
| (b) | dp0 < 0, dv0 > 0, Vx < 0 and Vy > 0 | |
| (c) | dp0 < 0, dv0 > 0, Vx < 0 and Vy < 0 | |
| (d) | dp0 ≧ 0, dv0 < 0, Vx > 0 and Vy > 0 | |
| (e) | dp0 > 0, dv0 < 0, Vx < 0 and Vy < 0 | |
| (f) | dp0 > 0, dv0 < 0, Vx > 0 and Vy < 0 | |

Figure 13:
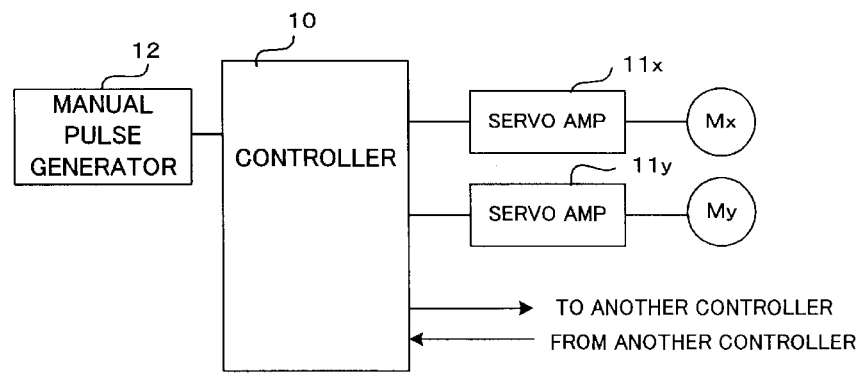
FIG. 13 is a schematic block diagram of a controller for carrying out the method of the present invention.

FIG. 13 schematically shows a control system for carrying out the acceleration/deceleration method of the present invention. A numerical controller is used as a controller in the control system and since configuration and function of the numerical controller are well known in the art, the following description will be made in summary.

A numerical controller 10 comprises a processor, memories such as ROM and RAM, an input/output circuit and a communication interface. In this embodiment, the numerical controller 10 controls two axis of a machine. The numerical controller 10 drivingly controls a servomotor Mx and a servomotor My by performing feedback controls of positions and velocities of respective axes using feedback signals from position/velocity detectors provided at the servomotors Mx and My or at movable parts driven by the servomotors Mx and My.

A manual pulse generator 12 for generating pulses by manual operation by an operator is connected with the controller 10 and a pulse train is outputted of the manual pulse generator 12 in accordance with a speed of the manual operation with respect to a designated axis (Mx or My), and the designated servomotor is drivingly controlled by the controller 10 based on the pulse train from the manual pulse generator 12.

The controller 10 further connected with another controller for controlling a machine or an apparatus via the communication interface and a communication line to output/input signals to/from another controller.

Figure 14:
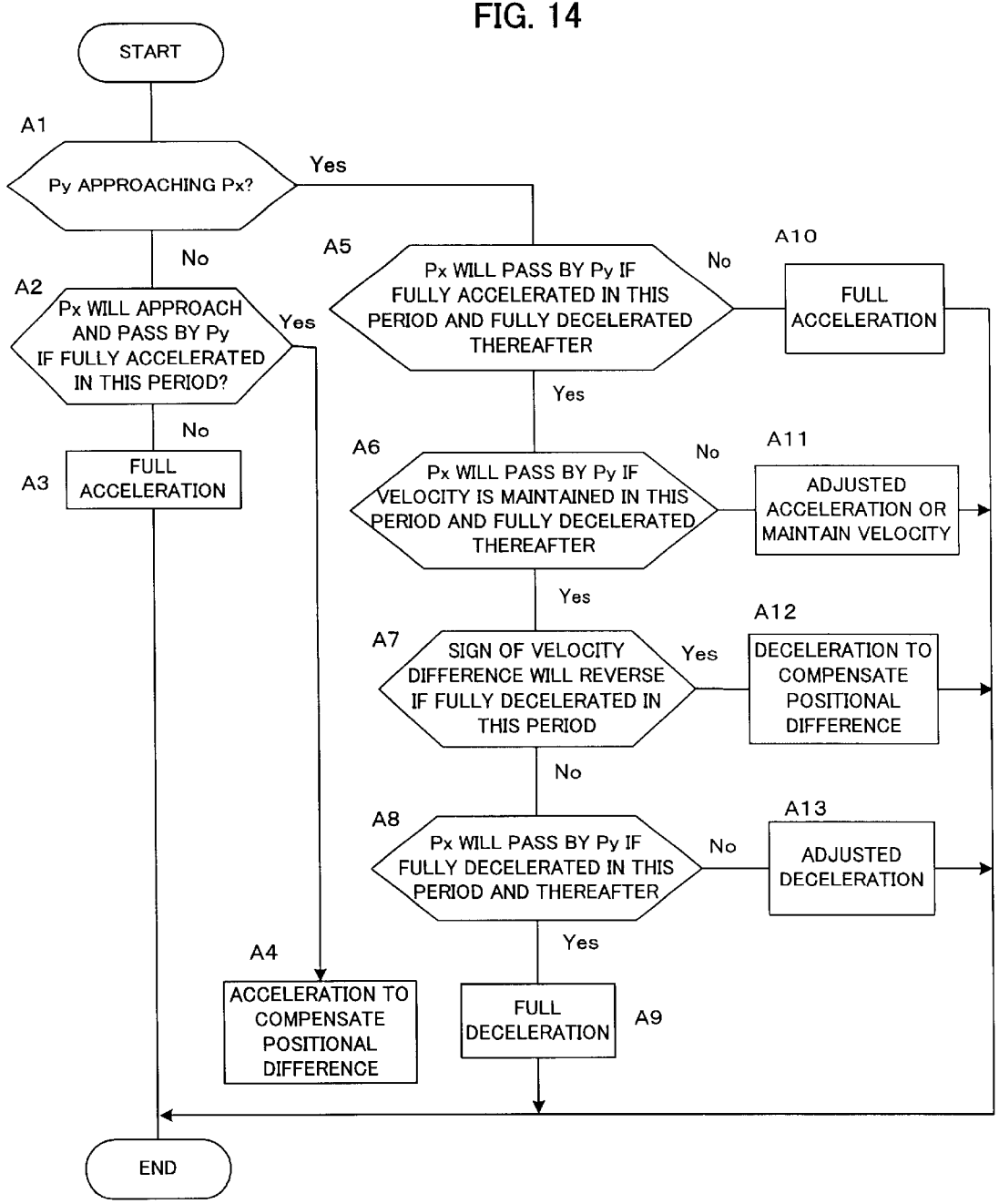
FIG. 14 is a flowchart of the acceleration/deceleration processing to be executed by a processor of the controller.

FIG. 14 is a flowchart of processing for carrying out the pursuing acceleration/deceleration method of the present invention, to be executed by the processor of the controller 10 as shown in FIG. 13. The servomotor My drives the objective axis Y at the target velocity Vy and the servomotor Mx drives the follower axis X. The servomotor Mx is controller by the controller 10 according to the processing as shown in FIG. 14. Hereinafter, the servomotor Mx is referred to as a follower axis servomotor and the servomotor My is referred to as an objective axis servomotor.

The follower axis X is differently controlled in dependence on the conditions of the positions and velocities of the follower axis and the objective axis, and therefore the processing to be executed by the processor of the controller 10 in every predetermined processing period will be described with respect to the respective conditions.

First, the terms "acceleration" and "deceleration" used in the following description are defined. In the case where the positional difference dp (=Py−Px) is of positive value, and in the case where the positional difference is "0" and the velocity difference dv(=Vy−Vx) is of positive value, an acceleration in positive direction is referred to as "acceleration" and an acceleration in negative direction is referred to as "deceleration". In the case where the positional difference dp is of negative value and in the case where the positional difference dp is "0" and the velocity difference dv is of negative value, the acceleration in negative direction is referred to as "acceleration" and the acceleration in positive direction is referred to as "deceleration".

I. In the case where the objective axis Y is not approaching ("leaving from") the follower axis X:

(1) in the case where the velocity Vx of the follower axis X will not exceed the target velocity Vy of the objective axis Y (the position Px will not approach the position Py) or the velocity Vx will exceed the target velocity Vy but the position Px of the follower axis X will not pass by the position Py of the objective axis Y, if the follower axis X is fully accelerated in the present processing period;→fully accelerate the follower axis X (2) in the case where the velocity Vx exceeds the target velocity Vy (the position Px will approach the position Py) and the position Px will pass by the position Py if the follower axis X is fully accelerated in the present processing period;

→accelerate the follower axis X by an amount for compensating the present positional difference dp II. In the case where the objective axis Y is approaching the follower axis X:

(1) in the case where the position of the follower axis X will not pass by the position of the objective axis Y if the follower axis X is fully accelerated in the present processing period and fully decelerated in the subsequent processing periods;

→fully accelerate the follower axis X (2) in the case where the position Px will not pass by the position Py if the velocity Vx is maintained in the present processing period and decelerated in the subsequent processing periods;

→maintain the velocity Vx or decelerate the follower axis X with an adjusted acceleration value (3) in the case where a sign of the velocity difference is reversed if the follower axis X is fully decelerated with the maximum value;

→decelerate the follower axis X by an amount for compensating the present positional difference dp (4) in the case where the position Px will not pass the position Py if the follower axis X is continued to be decelerated from the present processing period →maintain the velocity of the follower axis X or decelerate the follower axis X with an adjusted deceleration value (5) in the case other than the above cases (where the position Px will pass the position Py if the follower axis X is continued to be decelerated from the present processing period)

→decelerate the follower axis at the maximum value

In the above cases II-(2) and II-(4), "maintain the velocity Vx or accelerate/decelerate with an adjusted acceleration/deceleration value" is achieved by obtaining a difference between the positional difference dp and a distance of approach of the position Px to the position Py in processing periods of accelerating/decelerating the velocity Vx to the target velocity Vy, and dividing the difference by the number of processing periods of accelerating/decelerating the velocity Vx to the target velocity Vy, to determine an amount of the acceleration/deceleration for the present processing period.

FIG. 14 is the flowchart of the acceleration/deceleration processing to be executed by the processor of the controller 10. In this example, the objective axis Y is driven at the constant velocity Vy and when a pursuing command is issued for the follower axis X, the processor of the controller 10 starts the processing of FIG. 14 at the predetermined processing period.

First, it is determined whether or not the objective axis Y is approaching the follower axis X based on the positions Px, Py and the velocities Vx, Vy of the follower axis X and the objective axis Y (Step A1). The positions and the velocities may be obtained on the basis of the feedback signals from the position/velocity detectors provided at the servomotors for respective axes. Alternatively, the positions and the velocities may be obtained by obtaining the position form a present position register for obtaining the present position by multiplying the motion amounts commanded at every processing period for respective axes, and the velocity may be obtained from the motion amounts commanded in the immediately preceding period (which represents the velocity since the motion amount in the predetermined processing period). Thus, in Step A1, it is judged whether a sign of the positional difference dp (=Py−Px) and a sign of the velocity difference dv (=Vy−Vx) is different or not. If the signs are the same, it is determined that the objective axis Y is leaving from the follower axis X in the cases (a)–(f) shown in FIG. 11, and the procedure proceeds to Step A2. In Step A2, it is determined whether or not the position Px of the follower axis X does not exceed the position Py of the objective axis Y, or the velocity Vx of the follower axis X does not exceed the target velocity Vy of the objective axis Y, if the follower axis X is accelerated with the maximum value in the present processing period. This step corresponds to the above case I-(1). If either the position Px will not exceed the position Py or the velocity Vx will not exceed the velocity Vy, the follower axis X is accelerated with the maximum value. This processing is performed by outputting the motion amount obtained by adding the maximum acceleration value to the motion amount outputted in the immediately preceding period to accelerate the follower axis X. However, if it is determined that both of the position Px and the velocity Vx of the follower axis X will exceed the position Py and the velocity Vy of the objective axis Y, the motion amount obtained by adding an amount corresponding to a difference between the position of the follower axis X and the position of the objective axis Y to the motion amount outputted in the immediately preceding period is outputted (Step A4).

If it is determined that the objective axis Y is approaching the follower axis X in Step A1, it is determined whether or not the position Px of the follower axis X will pass by the position Py of the objective axis Y if the follower axis X is accelerated with the maximum value in the present processing period and is decelerated at the maximum value in the subsequent processing periods (Step A5). If it is determined that the position Px will not pass by the position Py if the follower axis X is fully accelerated at the present period and fully decelerated after the present period, the follower axis X is accelerated by outputting a motion amount obtained by adding the maximum acceleration amount to the immediately preceding motion amount (Step A10). The processing of Step A5 corresponds to the above case II-(1) and the processing between the time t1 and the time t2 in FIG. 6, as described later.

The above determination in Step A5 may be performed according to various methods. For example, assuming that the velocity Vx first becomes less than the velocity Vy by performing the full deceleration n-times from the present commanded velocity which is obtained by adding the maximum acceleration value to the commanded velocity in the immediately preceding processing period, the motion amount subjected to 1st deceleration processing is expressed as (Vx−β)×T, the motion amount subjected to 2nd deceleration is expressed as (Vx−2β)×T, . . . , the motion amount subjected to n-th deceleration is expressed as (Vx−nβ)×T. Thus, the sum of the motion amounts subjected to the n-times full deceleration is expressed as follows;

$$\sum x = (Vx - \beta) \times T + (Vx - 2\beta) \times T + \ldots + (Vx - n\beta) \times T \quad (1)$$
$$= n \cdot T \cdot Vx - T \cdot \beta \cdot (1 + 2 + \ldots + n)$$
$$= n \cdot T \cdot Vx - T \cdot \beta \cdot (n(n+1)/2)$$

The sum Σx of the motion amounts subjected to n-th deceleration, the motion amount from the start of the acceleration/deceleration processing to the present processing period and the motion amount subjected to the fill acceleration in the present processing period are added up to obtain the motion amount of the follower axis X from the start of the acceleration/deceleration processing to the time when the position Px first becomes less than the position Py. Thus, it is determined whether or not a difference between the sum of the motion amounts of the position Px and the motion amount of the position Py from the stat of the acceleration/deceleration processing to the time exceeds the initial positional difference dp0.

In the above procedure, the positional difference dp and the velocity difference dv between the objective axis Y and the follower axis X are used as dynamic conditions for obtaining the velocity Vx of the follower axis X for the present processing period in the acceleration/deceleration processing. The acceleration/deceleration is performed dynamically by determining the acceleration/deceleration value periodically based on the dynamic conditions.

If the result of the determination in Step A5 is "Yes", the determination in the above case II-(2) is performed in Step A6. It is determined whether or not the position Px will pass by the position Py if the velocity Vx is maintained in the present processing period and fully decelerated in the subsequent processing periods. This determination can be performed according to the method as described with respect to Step A5. If it is determined that the position Px will pass by the position Py if the velocity Vx is maintained in the present processing period and decelerated in the maximum value in the following processing periods, the velocity Vx is maintained or the follower axis X is accelerated with an adjusted acceleration amount. This processing is performed by obtaining a difference between the positional difference dp and the distance necessary for decelerating the velocity Vx to the target velocity Vy, and the obtained difference is divided by the number of processing periods necessary for decelerating the follower axis X to the target velocity Vy to determine the acceleration amount for one processing period. Thus, the follower axis X is accelerated by the determined acceleration amount (Step A11).

If the results of determination in Step A6 is "Yes", the procedure proceeds to Step A7 where it is determined whether or not the sign of the velocity difference dv will reverse if the follower axis X is fully decelerated in the present processing period. If it is determined that the sign of the velocity difference dv will reverse, the follower axis X is decelerated to compensate the present positional difference dp (Step A12). The above processing in Steps A7 and A12 corresponds to the processing in the above case II-(3).

Further, if the result of determination in Step A7 is "No", the procedure proceeds to Step A8 where it is determined whether or not the position Px will pass the position Py if the follower axis X is decelerated continuously from the present processing period. If the position Px will not pass the position Py, the follower axis X is decelerated by an adjusted deceleration amount (Step A13). This processing may be performed by obtaining a difference between the positional difference dp and the distance necessary for decelerating the velocity Vx to the target velocity Vy, and the obtained difference is divided by the number of processing periods necessary for decelerating the follower axis X to the target velocity Vy to determine the deceleration amount for one processing period. The follower axis X is decelerated with the determined deceleration amount. This processing corresponds to the processing in the above case II-(4).

If the result of determination in Step A8 is "Yes", the follower axis X is fully decelerated (Step A9). This processing corresponds to the processing in the above case II-(5).

With the above procedure, the acceleration/deceleration is performed so that the position and the velocity of the follower axis X are equal to the position and velocity of the objective axis Y, respectively, as described with reference to FIGS. 6–12.

The above procedure shown in FIG. 14 will be described further in detail with respect to the case as shown in FIGS. 5 and 6.

The processing of FIG. 14 is started when a command of pursuing acceleration/deceleration processing is inputted. First, it is determined whether or not the positional difference dp is decreasing, i.e., the position of the objective axis Y is reaching the position of the follower axis X (Step A1). Since the initial positional difference dp0 and the initial velocity difference dv0 have positive values in this example, it is determined the positional difference dp is increasing and the procedure proceeds Step A2. In Step A2, since the position Px will not pass by the position Py if the follower axis X is filly accelerated in the present processing period at the beginning of the procedure, the procedure proceeds to Step A3 where the follower axis X is fully accelerated by outputting a motion command obtained by adding the maximum acceleration amount to the motion command in the immediately preceding processing period. The processing of Steps A1–A3 is repeatedly executed until the velocity Vx exceeds the velocity Vy. These periods corresponds to the time period between t0 and t1 in FIG. 6.

When the velocity Vx exceeds the velocity Vy after the time t1, the positional difference dp begins decreasing and the determination result in Step A1 turns "Yes" and the procedure proceeds to Step A5. In Step A5, it is determined whether or not the position Px will not reach the position Py if the follower axis X is fully accelerated in this processing period and filly decelerated continuously in the subsequent processing periods, as indicated by the dotted arrow in FIG. 6. In this example, it is determined that the position Px will not reach the position Py for a certain time after the velocity Vx exceeds the velocity Vy and the procedure proceeds Step A10 where the follower axis X is filly accelerated. The processing of Steps A1, A5 and A10 is repeatedly executed for the time period between the time t1 and the time t2.

When the determination result in Step A5 turns "Yes" at the time near the time t2, the procedure proceed to Step A6 where it is determined whether or not the position Px will pass by the position Py if the velocity Vx is maintained in the present processing period and decelerated continuously in the subsequent processing periods. If it is determined that the position Px will not pass by the position Py, the acceleration amount to be added to the velocity command is adjusted or the velocity Vx is maintained at Step A11.

If the determination result in Step A6 is "Yes", it is determined whether or not the sign of the velocity difference dv will reverse if the follower axis X is decelerated in the present processing period in Step A7. If the sign of the velocity difference will reverse, the deceleration amount to be subtracted from the present motion amount is adjusted at Step A12.

If the determination result in Step A7 is "No", it is determined whether or not the position Px will pass by the position Py if the follower axis X is decelerated in the present and the subsequent processing periods in Step A8.

In the subsequent processing periods, the determination results in Step A5 and A6 are "Yes" since the acceleration amount has been adjusted so that the position Px will reach the position Py to make the positional difference dp be "0" if the follower axis X is fully decelerated continuously. The determination result in Step A7 is "No" until the velocity Vx come closer to the velocity Vy, and the procedure proceeds to Step A8 where it is determined whether or not the position Py will pass by the position Px if the follower axis X is fully decelerated in the present and the subsequent processing periods. If it is determined that the position Py will pass by the position Px, the follower axis X is fully decelerated at Step A9 and if it is determined that the position Py will not pass by the position Px, the deceleration amount is adjusted at Step A13.

Subsequently, the processing of Step A9 or Step A13 is performed in the time period between the time t2 and the time t3 in FIG. 6. Then, it is determined in Step A7 that the sign of the velocity difference dv will reverse if the follower axis is fully decelerated in the present processing period in the vicinity of the time te, and the procedure proceeds to Step A12 where the follower axis X is decelerated so that the velocity Vx equals to the velocity Vy and the positional difference dp is canceled. Thus, the positions and the velocities of the objective axis Y and the follower axis X are made equal. In the subsequent processing periods, the determination results in Steps A1 and A2 turn "No" and "Yes", respectively, and the procedure proceeds Step A4 where the follower axis X is accelerated to cancel the positional difference dp. In this case, the positional difference has already canceled to be "0" except a normal error and thus the acceleration of the follower axis X is not performed. Consequently, the follower axis X moves in synchronism with the objective axis Y with their positions and also velocities respectively coincide with each other.

The above procedure is performed for the cases (a)–(c) shown in FIG. 11, and the similar procedure is performed for the cases (d)–(f) only differs in that the acceleration is effected in the negative direction since the positional difference dp has a negative value.

The case in which the acceleration/deceleration processing as shown in FIG. 8 is performed on the initial conditions shown in FIG. 7 will be described.

In this case, since the position Py is approaching the position Py at the start of the acceleration/deceleration processing, the procedure proceeds from Step A1 to Step A5. It is determined whether or not the position Px will pass by the position Py if the follower axis X is filly accelerated in this processing period and fully decelerated in the subsequent processing periods. In this case, it should be noted that the direction of acceleration is negative and the direction of deceleration is positive since the positional difference dp is negative according to the definition of these terms. With the initial conditions of the positional difference dp0 and the velocity difference dv0 shown in FIG. 8, the position Px will not pass by the position Py if the follower axis X is filly accelerated in the present processing period and filly decelerated in the subsequent processing periods at the beginning of the control (as indicated by the dotted arrow). Thus, the procedure proceeds Step A10 where the follower axis X is fully accelerated (in the negative direction). The processing of Step A10 to filly accelerate the follower axis X is performed in the period from the time "0" to the time t1.

When it is determined that the position Px will pass by the position Py if the follower axis X is filly accelerated in the present processing period and fully decelerated in the subsequent processing periods in the vicinity of the time t1, the procedure proceeds from Step A5 to Step A6. In Step A6, it is determined whether or not the position Px will pass by the position Py if the velocity Vx of the follower axis X is maintained in the present processing period and fully decelerated (in the negative direction) in the subsequent processing periods. If it is determined that the position Px will not pass by the position Py, the acceleration amount is adjusted at Step A11. If it is determined that the position Px will pass by the position Py, the procedure proceeds to Step A7. At this stage, the sign of the velocity difference dv will not reverse and the procedure proceeds to Step A8. In Step A8, it is determined whether or not the position Px will pass by the position Py if the follower axis X is fully decelerated in the present and subsequent processing periods. If it is determined that the position Px will pass by the position Py, the follower axis X is fully decelerated (in the negative direction) at Step A9. If it is determined that the position Px will not pass by the position Py, the deceleration amount is adjusted at Step A13.

In the subsequent processing periods from time t1 to time te as shown in FIG. 8, the determination results in Steps A5, A6 and A7 turn "Yes", "Yes" and "No", respectively, to perform the full deceleration of the follower axis X.

When it is determined that the sign of the velocity difference dv will reverse if the follower axis X is fully decelerated in the present processing period at Step A7 in the vicinity of the time te, the procedure proceeds to Step A12 to decelerate the follower axis X to compensate the present positional difference. With the above procedure, the positions and velocities of the follower axis X and the objective axis Y respectively coincide with each other.

In the case shown in FIG. 9, immediately after starting the acceleration/deceleration processing, it is determined that the position Px will pass by the position Py if the follower axis X is fully accelerated in the present processing period and filly decelerated in the subsequent processing periods at Step A5, and the procedure proceeds to Step A6. At Step A6, it is determined that the position Px will pass the position Py if the velocity Vx is maintained in the present processing period and decelerated in the subsequent processing periods. The determination result in Step A7 is "No" to proceed Step A8. In Step A8, it is determined that the position Px will not pass the position Py if the follower axis X is fully decelerated in the present and subsequent processing periods and the deceleration amount is adjusted at Step A13. From the next processing period, the same procedure as that performed between the time t1 and the time te in FIG. 8 is performed. In the vicinity of the time te, the procedure proceeds from Step A7 to Step A12 where the follower axis X is decelerated to compensate the present positional difference, so that the positions and velocities of the follower axis X and the objective axis Y respectively coincide with each other.

In the case, as shown in FIG. 10, where the initial positional difference dp0 is small and the initial velocity difference dv0 is large, the position Px will pass by the position Py if the follower axis X is fully decelerated immediately after the start of the acceleration/deceleration processing. In this case, the processing of Steps A1, A5–A8 is executed and it is determined that the position Px will pass by the position Py if the follower axis X is filly decelerated form the present processing period and the procedure proceeds to Step A9 where the follower axis X is fully decelerated. In the subsequent processing periods, since the positional difference dp is changed from decreasing to increasing, the procedure proceeds from Step A1 to Step A2 and the same procedure as shown in FIG. 6 is carried out.

The same procedure as described on FIGS. 8–11 is carried out for the cases (a)–(c) shown in FIG. 12 and the similar procedure only different in that the direction of the acceleration is positive is carried out for the cases (d)–(f) in FIG. 12.

In the foregoing embodiments, the acceleration of a constant value is adopted. Alternatively, the acceleration varying according to a linear equation, a quadratic equation, etc. may be adopted.

Figure 15:
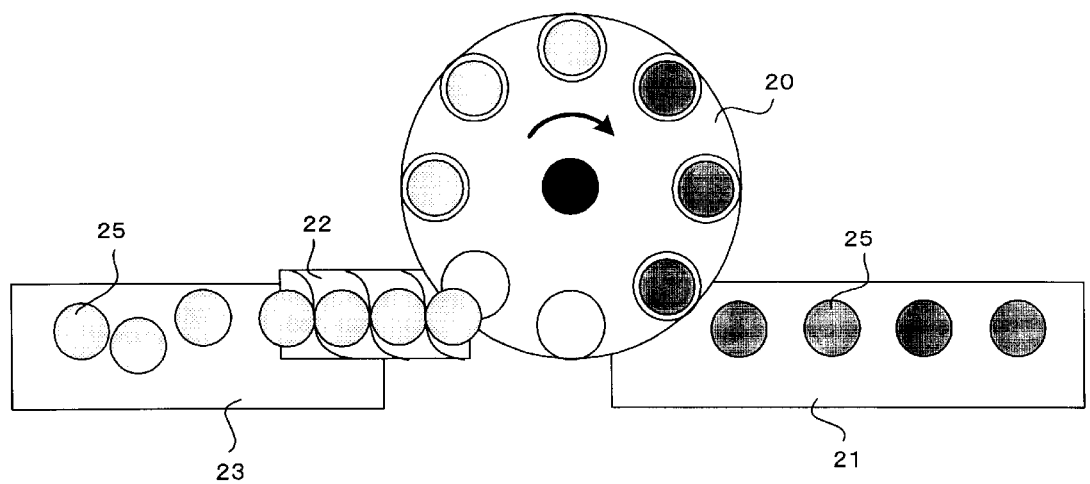
FIG. 15 is a schematic view showing an example of a machine to which the method of the present invention is applied.

An example of application of the acceleration/deceleration method of the present invention is shown in FIG. 15.

In this system, bottles 25 conveyed on an upper-stream conveyer 23 are aligned by an aligning mechanism 22 and placed on predetermined positions on a filling machine 20. The bottles 25 are filled with liquid on the filling machine 20 and the bottles 25 filled with liquid are transferred to a down-stream conveyer 21 and conveyed on the conveyer 21.

In this conveying/filling system, when supply of the bottles 25 from the upper steam of the conveyer 23 is stopped, the upper-stream conveyer 23 and the aligning mechanism 20 are stopped but the filling machine 20 and the down-stream conveyer 21 are continued to run since the bottles 25 remain on the machine 20 and the conveyer 21. Thereafter, when the supply of bottles 25 are restarted, the upper-stream conveyer 23 and the aligning mechanism 22 are started to run. At this stage, since the bottles 25 have to be transferred and placed on the predetermined positions on the filling mechanism 20 form the aligning mechanism 22, it is necessary to synchronize the operations of the aligning mechanism 22 and the filling mechanism 20 so that the positions and velocities of the aligning mechanism 22 and the filling machine 20 respectively coincide with each other. The acceleration/deceleration method of the present invention is preferably adopted in this system. For example, a driving axis of the filling machine 20 and the downstream conveyer 21 is controlled as the objective axis Y, and a driving axis of the upstream conveyer 23 and the aligning mechanism 22 is controlled as the follower axis X in accordance with the acceleration/deceleration method of the present invention, so that the positions and velocities of the aligning mechanism 22 and the filling mechanism 20 respectively coincide with each other.

In the foregoing embodiments, the follower axis X and also the objective axis Y are controlled by the controller 10. Alternatively, the objective axis Y is controlled by other controller which is connected with the controller 10 so that the controller 10 receives information on position and/or velocity of the objective axis Y and the controller 10 controls the follower axis X based on the received information. The velocity information may be obtained as a difference between the position information of this processing period and the position information of the immediately preceding processing period, and the position information may be obtained as the sum of the velocity information.

Further, the objective axis Y is controlled by the controller 10 and send information on the motion command (velocity information) obtained by the processing shown in FIG. 14 on the follower axis X to the other controller, so that the other controller controls the follower axis X on the basis of the received information on the motion command.

Furthermore, the servomotor Mx may be controlled using the pulse train outputted from the manual pulse generator 12 treated as the position and velocity of the objective axis Y. The sum of the pulses generated by the pulse generator 12 is treated as the position of the objective axis Y and the velocity of generation of the pulses is treated as the velocity of the objective axis Y.

Also, the follower axis X may be controlled to catch up with any objective axis including a counter value of a timer or a pace maker treated as the position and velocity of the objective axis Y. Further, a position and a velocity of any axis detected by a detector may be used as the position and the velocity of the objective axis Y, and the follower axis X may be controlled based on the detected position and velocity of the objective axis Y.

According to the present invention, the motion of the follower axis X is controlled to be fully synchronized with the motion of the objective axis Y so that the positions and also the velocities of the follower axis and the objective axis respectively coincide with each other.

What is claimed is:

1. An accelerating/decelerating method for controlling a position and a velocity of a follower axis to pursue a position and a velocity of an objective axis, respectively, comprising the steps of:

obtaining a positional difference between the positions of the objective axis and the follower axis and a velocity difference between the velocities of the objective axis and the follower axis;

performing a predetermined acceleration/deceleration processing based on said positional difference and said velocity difference, so that the position and the velocity of the follower axis coincide with the position and the velocity of the objective axis, respectively.

2. An acceleration/deceleration method according to claim 1, wherein conditions of an initial positional difference and an initial velocity difference between the objective axis and the follower axis are sorted into a plurality of cases and the velocity of the follower axis is obtained for each case.

3. An acceleration/deceleration method according to claim 1, wherein the positional difference and the velocity difference between the follower axis and the objective axis are used as dynamic conditions for obtaining the velocity of the follower axis in the acceleration/deceleration, and the acceleration/deceleration is dynamically performed by determining velocity of the follower axis based on the dynamic condition.

4. An acceleration/deceleration method according to claim 3, wherein different acceleration/deceleration values are set for the acceleration of the follower axis with respect to the objective axis and for the deceleration of the follower axis with respect to the objective axis.

5. An acceleration/deceleration method according to claim 3, wherein the velocity of the follower axis is limited not to exceed a predetermined value.

6. An acceleration/deceleration method for controlling a position and a velocity of a follower axis to pursue a position and a velocity of an objective axis, respectively, comprising the steps of:

obtaining a sum of a positional displacement between the follower axis and the objective axis from a start of an acceleration/deceleration, and an initial positional difference between the follower axis and the objective axis at the start of the acceleration/deceleration; and controlling a time period of the acceleration and a time period of the deceleration of the follower axis so that said sum of the positional displacement and the initial positional difference is made zero when the velocity of the follower axis coincides with the velocity of the objective axis.

7. An acceleration/deceleration method according to claim 6, wherein conditions of the initial positional difference and an initial velocity difference between the objective axis and the follower axis are sorted into a plurality of cases and the velocity of the follower axis is obtained for each case.

8. An acceleration/deceleration method according to claim 6, wherein the positional difference and the velocity difference between the follower axis and the objective axis are used as dynamic conditions for obtaining the velocity of the follower axis in the acceleration/deceleration, and the acceleration/deceleration is dynamically performed by determining velocity of the follower axis based on the dynamic condition.

9. An acceleration/deceleration method according to claim 8, wherein different acceleration/deceleration values are set for the acceleration of the follower axis with respect to the objective axis and for the deceleration of the follower axis with respect to the objective axis.

10. An acceleration/deceleration method according to claim 8, wherein the velocity of the follower axis is limited not to exceed a predetermined value.

11. An accelerating/decelerating method for controlling a velocity of a follower axis to pursue a velocity of an objective axis and a position of the follower axis to have a predetermined positional relation with respect to a position of the objective axis, said method comprising the steps of:

obtaining a positional difference between the positions of the objective axis and the follower axis and a velocity difference between the velocities of the objective axis and the follower axis;

setting acceleration/deceleration values for acceleration and deceleration of the follower axis; and starting acceleration/deceleration of the follower axis in response to an acceleration/deceleration start command, and controlling the follower axis so that the velocity of the follower axis pursues to coincide with the velocity of the objective axis through an acceleration process and a deceleration process with the set acceleration/deceleration value, wherein a change-over from the acceleration process to the deceleration process or from the deceleration process to the acceleration process of the follower axis is determined based on the positional difference between the objective axis and the follower axis and a motion amount of the follower axis with respect to a motion amount of the objective axis from time of the change-over of the acceleration/deceleration to time when the velocity of the follower axis reaches the velocity of the objective axis.

12. An acceleration/deceleration method according to claim 11, wherein a constant velocity process where the follower axis is driven at a constant velocity is interposed between the acceleration process and the deceleration process.

13. An acceleration/deceleration method according to claim 11, wherein the acceleration value for acceleration of the follower axis and the deceleration value for deceleration of the follower axis are different.

* * * * *

UNITED STATES PATENT AND TRADEMARK OFFICE
CERTIFICATE OF CORRECTION

PATENT NO. : 6,647,353 B2
DATED : November 11, 2003
INVENTOR(S) : Kentaro Fujibayashi et al.

It is certified that error appears in the above-identified patent and that said Letters Patent is hereby corrected as shown below:

Column 1,
Line 47, change "coincides" to -- coincide --.

Column 4,
Line 20, change "αat" to -- α at --.
Line 28, change "a" to -- α --.

Column 11,
Line 16, change "fill" to -- full --.

Column 12,
Lines 33 and 48, change "filly" to -- fully --.

Column13,
Lines 56, 64 and 65, change "filly" to -- fully --.

Column 14,
Lines 3, 6 and 44, change "filly" to -- fully --.

Column 15,
Line 2, change "filly" to -- fully --.

Signed and Sealed this

Twenty-fourth Day of February, 2004

JON W. DUDAS
*Acting Director of the United States Patent and Trademark Office*